Sept. 18, 1962 R. O. WILEY 3,054,878

WIRING DEVICE FOR CONTROLLING CIRCUITS

Filed July 18, 1960

2 Sheets-Sheet 1

WITNESSES

Edwin E. Bassler

Edward F. Possessky

INVENTOR

Roy O. Wiley

BY D. Smith

ATTORNEY

Sept. 18, 1962 R. O. WILEY 3,054,878

WIRING DEVICE FOR CONTROLLING CIRCUITS

Filed July 18, 1960 2 Sheets-Sheet 2

United States Patent Office 3,054,878

Patented Sept. 18, 1962

3,054,878

WIRING DEVICE FOR CONTROLLING CIRCUITS

Roy O. Wiley, Newtown, Conn., assignor to The Bryant Electric Company, Bridgeport, Conn., a corporation of Connecticut Filed July 18, 1960, Ser. No. 43,485
9 Claims. (Cl. 200—152)

The present invention relates to wiring devices and more particularly to circuit controllers of the quiet operating type.

In arranging physical elements to form a wiring device, it is desirable that the elements be minimized in number so as to result in minimal construction cost yet so as to enable the device to operate with its intended functions. For an example, if a given set of functions is intended to be provided, the use of a combination of plurally functional elements is clearly more desirable than the ordinary use of a combination of elements greater in number with each or some of the latter being less functional than the former.

Moreover, once the general form of the arrangement of elements is conceived, it is desirable that the physical relations among the elements be established so as to enable the intended functions of the device to be provided consistently from unit to unit of production irrespectively of normally encountered variations in the physical size of the employed elements. To exemplify the latter objective, one might consider the desirability of providing consistency in the "feel" of operating the actuator of a given circuit controller from unit to unit of production.

The preceding considerations relate to wiring devices generally. Relative to wiring devices in the form of quiet operating circuit controllers, or, as to be termed here, switches, it is desirable that the latter be provided with smoothness in operation and with operational noise level as low as feasibly obtainable. The objective of smooth operation can be obtained, as an example, by providing minimal frictional restraint between the actuating parts of the switch. To obtain the objective of quiet operation, one must earmark the sources of objectionable noise with a view toward eliminating these sources by suitably providing and inter-relating the various switch elements.

Thus, in the specific case of a mercury switch in which a button containing mercury is ordinarily employed for circuit making and breaking purposes, thereby eliminating the noise attendant to the operation of mechanical circuit making and breaking means, true quietness of operation can be obtained only by removing other probable sources of noise. As an example, although conventional mercury switches substantially eliminate the noise attendant to contact actuation or control, there still exists the fact that the means, as a handle, employed for actuating the mercury button is prone upon operation to collide with adjacent physical members, as a wall plate or the like, resulting in the creation of objectionable noise. Removal of the latter effect is therefore necessary for true operational quietness. In the perspective of the preceding remarks, the invention, as described here, will be better understood.

Thus, it is an object of the invention to provide a novel wiring device which is characterized by economy.

It is another object of the invention to provide a novel wiring device which is formed so as to be provided with consistency in operating character from unit to unit of production.

An additional object of the invention is to provide a novel switch, characterized as described in the two preceding objects, and being so formed as to have smoothness of operation.

Another object of the invention is to provide a novel switch including means for quieting its operation by limiting its handle movement with a damping effect.

It is a further object of the invention to provide a novel mercury switch having means for smoothing its operation through reduction of the frictional restraint upon its handle movement and for quieting its operation by limiting its handle movement with a damipng effect.

Another object of the invention is to provide a novel switch having resilient means for resiliently limiting movement of the switch handle.

These and other objects will become more apparent upon consideration of the following detailed description of a specific embodiment of the invention considered in conjunction with the accompanying drawings in which.

Figure 1:
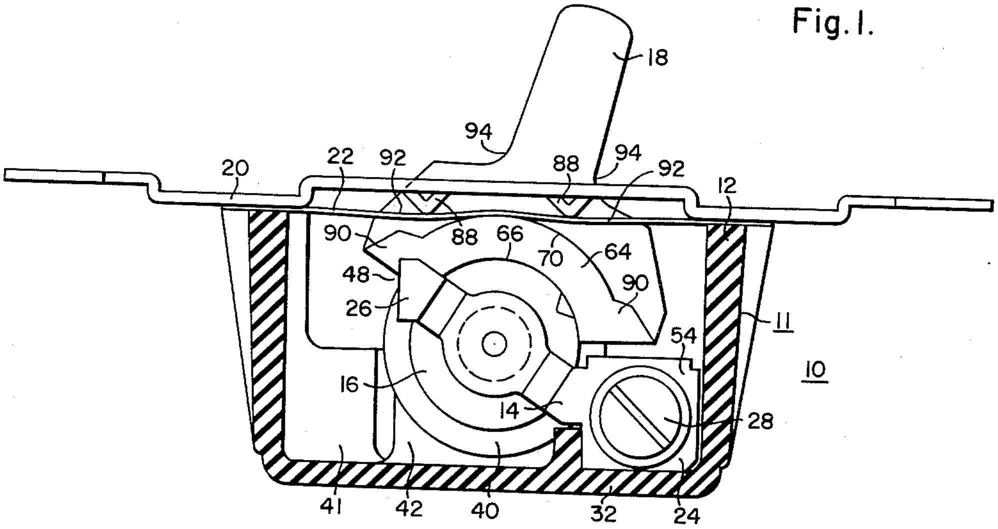
FIGURE 1 is a longitudinal sectional view of a wiring device, here a mercury switch, constructed in accordance with the principles of the invention.
Figure 2:
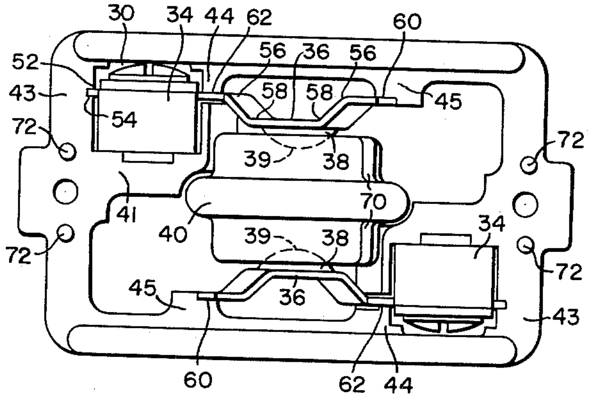
FIG. 2 is a top plan view of a housing and the internal operative elements of the switch shown in FIG. 1.
Figure 3:
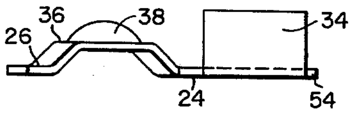
FIG. 3 is a top plan view of a conductive terminal shown assembled with the switch in FIGURE 1.
Figure 4:
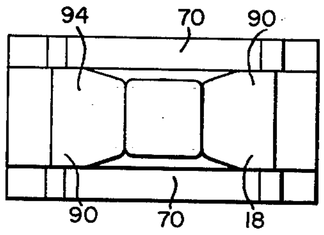
FIG. 4 is a top plan view of a handle shown assembled with the switch of FIGURE 1.
Figure 5:
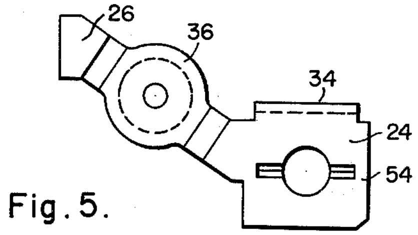
FIG. 5 is an elevational view of the terminal shown in FIGURE 3.

With reference to FIGURE 1, a wiring device 10, being for exemplary purposes in the form of a mercury switch 11, is provided for connection in an electrical circuit. The switch 11 includes an elongated insulative base member or housing 12 for supporting other operative elements of the switch 11. Thus, the switch 11 also includes conductive terminals 14 which can be connected to circuit conductors, means in the form of a mercury button 16 for controlling the continuity of the connected circuit, means embodied as a handle 18 for actuating the mercury button 16, and a yoke 20 for mounting the switch 11 and for retaining the terminals 14, the mercury button 16 and the actuating handle 18 in supported relation to the housing 12. In addition, means, namely a resilient elongated strap member 22 being flexible for longitudinal bending and being held against the housing 12 by the yoke member 20, are employed for damping and for limiting the movement of the handle 18 so as to provide smoothness of operation for the handle 18.

As viewed in FIGURES 1, 2, 3 and 5, each of the terminals 14 is provided with a conductor engaging portion 24 and a conductive arm 26 for engaging the mercury button 16. A screw 28 and a nut (not shown) are provided on the conductor engaging portion 24 for the purpose of connecting the switch 11 to the aforementioned circuit conductors.

The housing 12 is provided with a side opening 30 for the purpose of providing access to the screw 28 and an opening (not shown) through its bottom wall 32 for entrance of the circuit conductors to be engaged by the conductor engaging terminal portion 24. A cross bar 34 of the conductor engaging portion 24 serves to limit the entering movement of the circuit conductors.

The mercury button 16 is provided with recesses 39 centrally of its sides for pivotal engagement with an offset portion 36 of each of the terminal arms 26. Thus, a bump 38 is provided on each of the offset portions 36 for engagement with the mercury button 16 in one of its recesses 39. In addition, a rim portion 40 is provided peripherally about the mercury button 16. In this connection, the housing 12 is provided with a partition wall 41 having an arcuate portion 42 adjacently of which the button rim portion 40 is positioned.

It is to be noted that the terminals 14, when engaged with and held within the housing 12 relative to the mercury button 16 are rigidly supported against movement. Thus, in this embodiment, movement of the terminals 14 laterally of the housing 12 is precluded by the button 16 abutting the terminal bumps 38 and by housing abutments 44 and 45 engaging the terminal arms 28. For the same effect, end housing walls 43, through slots 52, engage wings 54 of the conductor engaging portions 24, respectively, of the terminals 14. The housing abutments 45 also function, along with the housing end walls 43, to prevent longitudinal movement of the terminals 14.

Perhaps more importantly, the housing abutments 45 and housing end walls 41 preclude pivotal movement of the terminals 14 when conductors are inserted through the housing bottom wall 32 for engagement with the conductor engaging portions 24. Thus, any torque upon one of the terminals 14 about its bump 38, resulting from the insertional movement of a conductor, is equalized by opposing torques arising in the adjacent housing abutment 45 and the adjacent end wall 43 through the slot 52. Thus, the housing 12 is plurally functional to hold the terminals 14 against lateral and longitudinal as well as pivotal movement. As a direct result, separate insulators or the like are not required for holding the terminals 14 in supported relation to the housing 12, particularly as against pivotal movement.

From the foregoing, it follows that an assembly of the elements thus far described can be accomplished simply by grasping the terminals 14 and the mercury button 16, in sub-assembled form, and inserting them into the housing 12 to be supported as already described. In order to effect operational consistency in the force necessary to cause pivotal movement of the mercury button 16 about the terminal bumps 38, means, including bends forming the offset terminal portions 36 as indicated by the reference characters 56 and 58, are provided for enabling the terminal arms 26 to be stressed to their yield point upon their assembly with the housing 12. Thus, the insertion of the terminals 14 and the mercury button 16 as a subassembly is necessarily a forceful one with forces being imposed by the housing 12 at the points indicated by the reference characters 60 and 62 upon the terminal arms 26 and by the mercury button 16 upon the terminal offset portions 36. The terminal arms 26 can be provided within prescribed dimensional ranges so as always to yield in response to the foregoing forces, with the amount of setting that results being functionally dependent upon the original dimensions of the terminal arms 26. Thus, since the terminal arms 26 yield upon insertion in the housing 12 to set in a position determined in amount by their particular dimensional characteristics, consistency in the engaging forces between the terminal arms 26 and the mercury button 16 is clearly provided from unit to unit of production. The pragmatic effect, of course, is to provide uniformity in the "feel" of switch operation to the extent that the "feel" depends upon this parameter.

The handle 18 is provided with an arcuate portion 64 having an underside 66 engaging the mercury button 16. In addition, the handle arcuate portion 64 is provided with projections 68 for latching engagement with notches 69 provided in the mercury button 16. The latter relation provides pivotal movement for the mercury button 16 directly in response to pivotal movement of the handle 18. An upper side 70 of the handle arcuate portion 64 is, as observable in FIGURE 1, arcuate in form and, when engaged by the strap member 22, enables the handle 18 to be held against the button 16 thereby also to retain the terminals 14 within the housing 12.

Thus, means for holding the handle 18 in the housing 12 are provided here as including the strap member 18. As already noted, the strap 22 also functions to limit with a damping effect the movement of the handle 18. The strap 22 can be formed of a plastic material, such as nylon, desirably having a low coefficient of friction and considerable resistance to cold flow but having suitable resiliency. To position the strap 22 upon the housing 12, housing bosses 72 are provided. Thus, the strap 22, generally conforming in size to the outward or open side of the housing 12, is located upon the housing 12 so as to be held in place by the housing bosses 72, which project outwardly and adjacently of strap portions 73. Strips 76 of the strap 22, therefore, extend across the housing 12 to engage the upper side 70 of the handle arcuate portion 64.

Figure 6:
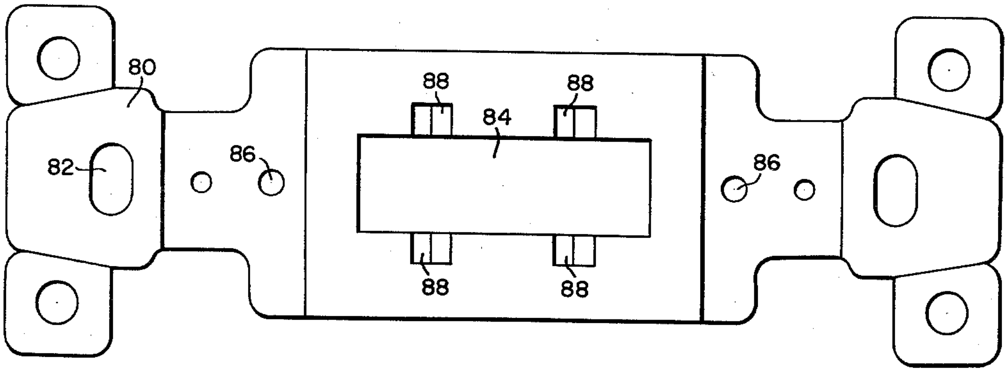
FIG. 6 is a top plan view of a mounting member or a yoke shown assembled with the switch in FIGURE 1.
Figure 7:
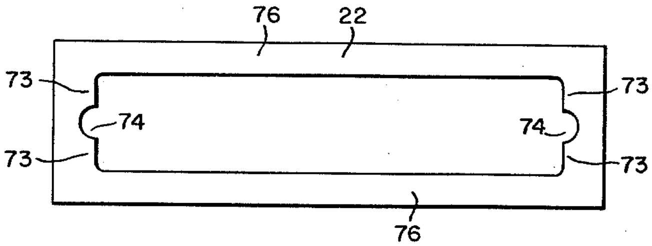
FIG. 7 is a top plan view of a buffer member in the form of a strap, which is shown assembled with the switch of FIGURE 1.

To complete the assembly of the switch 11, the yoke 20 can next be placed over the strap 22 upon the housing 12. As viewed in FIGURE 6, the yoke 20 is an elongated member having ears 80 with openings 82 for mounting screws and a centrally disposed slot 84 for passage of the handle 18 therethrough. Means for securing the yoke 20 to the housing 12 are provided here in the form of openings 86 for receiving fasteners or screws (not shown) which pass through recesses 74 in the strap member 22 for securance to the housing member 12.

Adjacently of the yoke slot 84, downwardly extended projections 88 are provided for engagement with the lateral strips 76 of the strap 22. Since the strap 22 is retained at its ends by the housing bosses 72, the strips 76 can be placed under tension, particularly when displaced upwardly by the handle arcuate portion 64, to impose a responsive downward holding force upon the handle 18 and the other elements of the switch 11. Of course, the yoke projections 88 serve to localize centrally of the strap 22 the upward displacement of the strips 76 thereby serving to enlarge the holding effect just described. With the strap 22 being characterized by a low coefficient of friction, the handle 18 is provided with smooth pivotal movement since the sliding relation of the upper side 70 of the handle arcuate portion 64 relative to the strap strips 76 is one which includes only nominal frictional restraint on the order necessary to avoid "completely free" movement.

In addition, the pivotal movement of the handle 18, as viewed in FIG. 1, is limited by deflectable portions 92 of the strap strips 76 serving as buffers against portions 90 of the arcuate portion 64. Thus, the buffer portions 92 of the strap 22 decelerate or damp resiliently and limit, substantially without detectable noise, movement of the handle 18.

By limiting the movement of the handle 18, the strap 22 prevents in this example, the handle portions 94 from colliding with the yoke 20 or with a wall plate (not shown) which would ordinarily be provided for the switch 11. As such, objectionable noise is thereby prevented, particularly in that the strap portions 92 are substantially not the source of substitutional noise.

In the foregoing description, a specific embodiment of the invention has been described only to illustrate and not to limit the general principles of the invention. Accordingly, it is intended that the invention be not limited by the illustrative embodiment, but rather that it be limited only by the scope and spirit of its broad principles.

What is claimed is:

1. A wiring device comprising an elongated insulative base, a mercury button, at least one conductive terminal, means for supporting said terminal upon said base and for pivotally supporting said button upon said terminal, an actuating handle engaging said mercury button for effecting pivotal movement of the same about said terminal, and means for supporting said handle relative to said base to enable the same to undergo pivotal movement, said handle supporting means including an elongated longitudinally flexible strap extending longitudinally along said base and means for supporting said strap upon said base and for holding a longitudinal portion of said strap in substantial bearing surface engagement with an arcuate portion of said handle so as to enable the latter to pivot smoothly relative to said strap yet so as to hold said handle in engaged relation with said mercury button, said strap supporting means including base end portions which tensibly engage said strap.

2. A wiring device comprising an elongated insulative base, a mercury button, at least one conductive terminal, means for supporting said terminal upon said base and for pivotally supporting said button upon said terminal, an actuating handle engaging said mercury button for effecting pivotal movement of the same about said terminal, and means for supporting said handle relative to said base to enable the same to undergo pivotal movement, said handle supporting means including an elongated flexible plastic strap extending across said base and engagingly over a portion of said handle so as to enable the latter to pivot smoothly relative to said strap yet so as to hold said handle in engaged relation with said mercury button, means for supporting said strap upon said base so as to hold said strap in longitudinal tension, and means for deflecting inwardly of said handle portion strap portions located adjacently of said handle portion so as to enlarge the holding effect of said strap upon said handle.

3. A wiring device comprising an elongated insulative base, a mercury button, at least one conductive terminal, means for supporting said terminal upon said base and for pivotally supporting said button upon said terminal, an actuating handle engaging said mercury button for effecting pivotal movement of the same about said terminal, and means for supporting said handle relative to said base to enable the same to undergo pivotal movement, said handle supporting means including an elongated flexible plastic strap extending across said base and engagingly over a portion of said handle so as to enable the latter to pivot smoothly relative to said strap yet so as to hold said handle in engaged relation with said mercury button, means for supporting said strap upon said base so as to hold said strap in longitudinal tension, and means for deflecting inwardly of said handle portion strap portions located adjacently of said handle portion so as to enlarge the holding effect of said strap upon said handle, said strap portions dampingly limiting the pivotal movement of said handle.

4. A wiring device comprising an elongated insulative base, a mercury button, at least one conductive terminal, means for supporting said terminal upon said base and for pivotally supporting said button upon said terminal, an actuating handle engaging said mercury button for effecting pivotal movement of the same about said terminal, and means for supporting said handle relative to said base to enable the same to undergo pivotal movement, said handle supporting means including a resilient flexible strap extending across said base and engagingly over a portion of said handle so as to enable the latter to pivot smoothly relative to said strap yet so as to hold said handle in engaged relation with said mercury button, a mounting member and means for engaging the same with said base, and means for supporting said strap upon said base including end portions of said base for tensibly holding said strap and inward projections of said mounting member for deflecting portions of said strap located adjacently of said handle portion to be held inwardly of said handle portion.

5. A wiring device comprising an insulative base, circuit controlling means and means for supporting the same upon said base, an actuating handle engaging a portion of said circuit controlling means to effect pivotal movement of the same, and means for supporting said handle relative to said base to enable the same to undergo pivotal movement, said handle supporting means including a resilient flexible strap extending across said base and engagingly over a portion of said handle so as to enable the latter to pivot smoothly relative to said strap yet so as to hold said handle in engaged relation with said circuit controlling portion, means for supporting said strap upon said base including end portions of said base for tensibly holding said strap, and means for deflecting inwardly of said handle portion strap portions located adjacently of said handle portion to provide means for dampingly limiting the pivotal movement of said handle.

6. A wiring device comprising an insulative base, circuit controlling means, means for supporting the same upon said base, an actuating handle engaging a portion of said circuit controlling means to effect pivotal movement of the same, means for supporting said handle relative to said base to enable said handle to undergo pivotal movement, said handle supporting means including an elongated flexible plastic strap extending across said base and engagingly over a portion of said handle so as to enable the latter to pivot smoothly relative to said strap yet so as to hold said handle in engaged relation with said circuit controlling means, means for supporting said strap upon said base so as to hold said strap in longitudinal tension, means for deflecting at least one portion of said strap inwardly of said base and adjacently of said handle portion, at least one projection on said handle portion being engageable with said strap portion so as to limit resiliently pivotal movement of said handle.

7. A wiring device comprising an insulative base, circuit controlling means, means for supporting the same upon said base, an actuating handle engaging a portion of said circuit controlling means to effect pivotal movement of the same, means for supporting said handle relative to said base to enable said handle to undergo pivotal movement, said handle supporting means including an elongated flexible plastic strap extending across said base and engagingly over a portion of said handle so as to enable the latter to pivot smoothly relative to said strap yet so as to hold said handle in engaged relation with said circuit controlling means, means for supporting said strap upon said base so as to hold said strap in longitudinal tension, means for deflecting at least one portion of said strap inwardly of said base and adjacently of said handle portion, at least one projection on said handle portion being engageable with said strap portion so as to damp resiliently and to limit resiliently pivotal movement of said handle.

8. A wiring device comprising an insulative base, a mercury button, a pair of elongated conductive terminals, each of said terminals having a conductor engaging portion at its one end and an arm extending from said conductor engaging portion, the arm of at least one of said terminals having a generally U-shaped portion bent angularly outwardly thereof so as to have its bight portion located outwardly of one side of said one terminal arm, said bight portion having means for pivotally engaging said mercury button, the arm of the other terminal also having means on one of its sides for pivotally engaging said mercury button, means for supporting said terminals with said mercury button engaged between said pivotal engaging means in a cavity extending inwardly from an open side of said base, said supporting means including a first housing portion engaging said other terminal arm on its side opposite its one side, said supporting means also including respective other housing portions engaging said one terminal arm respectively adjacent the ends of its U-shaped portion and on its side opposite its one side, said first housing portion and said other housing portions being transversely spaced less than the distance between the opposite sides of said terminal arms so as to require said terminal arms and said mercury button to be pressed together when placed into their supported position, the U-shaped portion of said one terminal arm being stressed to its yield point during initial placement of said terminals and said mercury button as a subassembly in said base cavity, and actuating means for pivoting said mercury button about said terminals.

9. A wiring device comprising an elongated insulative base, circuit controlling means and means for supporting the same upon said base, an actuating handle engaging a portion of said circuit controlling means to effect operation of the same, and means for supporting said handle relative to said base to enable the same to undergo pivotal movement, said handle supporting means including an elongated longitudinally flexible strap, means for supporting said strap in longitudinal tension and for holding a longitudinal portion of said strap in substantial bearing surface engagement with an arcuate portion of said handle to hold said handle inwardly of said base.

References Cited in the file of this patent

UNITED STATES PATENTS 2,749,413 Bordner ---------------- June 5, 1956